(12) United States Patent
Mizoguchi

(10) Patent No.: US 9,282,208 B2
(45) Date of Patent: Mar. 8, 2016

(54) FACSIMILE DEVICE, OPTION UNIT, AND CONTROL DEVICE

(71) Applicant: SEIKO EPSON CORPORATION, Tokyo (JP)

(72) Inventor: Masahiko Mizoguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/596,879

(22) Filed: Jan. 14, 2015

(65) Prior Publication Data

US 2015/0229783 A1 Aug. 13, 2015

(30) Foreign Application Priority Data

Feb. 10, 2014 (JP) .................................. 2014-023831
Feb. 10, 2014 (JP) .................................. 2014-023832

(51) Int. Cl.
*H04N 1/04* (2006.01)
*H04N 1/00* (2006.01)

(52) U.S. Cl.
CPC ........... *H04N 1/0057* (2013.01); *H04N 1/0032* (2013.01); *H04N 1/00246* (2013.01); *H04N 2201/0093* (2013.01); *H04N 2201/0094* (2013.01)

(58) Field of Classification Search
CPC ................... B65H 2801/39; B65H 2404/143; B65H 2405/3322; B65H 2407/21; B65H 3/047; H04N 2201/0081; H04N 1/00411; H04N 1/00482; H04N 1/0053; H04N 1/0057; H04N 1/00578; H04N 1/00612; H04N 1/00708

USPC ............ 358/1.14, 1.15, 1.12, 2.99, 449, 474, 358/497, 498; 399/174, 298, 327, 346, 405, 399/406, 367
See application file for complete search history.

(56) References Cited

U.S. PATENT DOCUMENTS

| | | | | |
|---|---|---|---|---|
| 4,860,119 A * | 8/1989 | Maniwa et al. | ............... | 358/296 |
| 4,924,320 A * | 5/1990 | Tanaka et al. | ................. | 358/296 |
| 5,030,987 A * | 7/1991 | Kato et al. | ...................... | 355/24 |
| 5,255,904 A * | 10/1993 | Taguchi et al. | .............. | 271/18.1 |
| 5,887,867 A * | 3/1999 | Takahashi et al. | ............. | 271/117 |
| 6,035,156 A * | 3/2000 | Okamoto et al. | ............... | 399/82 |
| 6,594,826 B1* | 7/2003 | Rao et al. | ......................... | 725/95 |
| 7,681,981 B2* | 3/2010 | Hoshi | ............................ | 347/22 |
| 8,264,752 B2* | 9/2012 | Katsuyama | .................. | 358/498 |
| 8,620,204 B2* | 12/2013 | Lee | ................................ | 399/405 |
| 8,712,310 B2* | 4/2014 | Shimizu et al. | ............... | 399/363 |
| 8,913,261 B2* | 12/2014 | Yasui | ............................ | 358/1.13 |
| 2005/0074266 A1* | 4/2005 | Hiramoto et al. | ............. | 399/391 |
| 2006/0161206 A1* | 7/2006 | Efimov et al. | ..................... | 607/5 |

(Continued)

FOREIGN PATENT DOCUMENTS

JP 2002-255382 A 9/2002
JP 2003-162181 A 6/2003

*Primary Examiner* — Negussie Worku
(74) *Attorney, Agent, or Firm* — Global IP Counselors, LLP

(57) ABSTRACT

One or more option units connecting with a communication system that includes a control part configured to control a communication are provided with an upper side signal line connecting with a lower side signal line of an option unit connected in an upper position, a lower side signal line connecting with an upper side signal line of an option unit connected in a lower position; and a control circuit. A potential of the upper side signal line is changed from the second potential in response to a potential change from a potential in a normal state which is different from a potential in an initial state of the lower side signal line.

11 Claims, 5 Drawing Sheets

(56) References Cited

U.S. PATENT DOCUMENTS

| | | |
|---|---|---|
| 2006/0164456 A1* | 7/2006 | Yamagishi et al. ............ 347/16 |
| 2007/0020007 A1* | 1/2007 | Azuma ........................ 399/367 |
| 2008/0094645 A1* | 4/2008 | Sato et al. ..................... 358/1.1 |
| 2011/0188885 A1* | 8/2011 | Fukunaga .................... 399/110 |
| 2013/0057920 A1* | 3/2013 | Nagata ........................ 358/1.16 |
| 2014/0092189 A1* | 4/2014 | Sakano ........................ 347/104 |

* cited by examiner

FACSIMILE DEVICE, OPTION UNIT, AND CONTROL DEVICE

CROSS-REFERENCE TO RELATED APPLICATIONS

This application claims priority to Japanese Patent Application No. 2014-023831 filed on Feb. 10, 2014 and Japanese Patent Application No. 2014-023832 filed on Feb. 10, 2014. The entire disclosures of Japanese Patent Application Nos. 2014-023831 and 2014-023832 are hereby incorporated herein by reference.

BACKGROUND

1. Technical Field

The present invention relates to a control device and an option unit that control a communication system connecting with a facsimile device and an option unit.

2. Related Art

The user can arbitrarily add a paper-feeding cassette (paper-feeding unit) as an option unit to a main body such as a multifunction device, etc. which is provided with a facsimile function or copying/printing functions. It is proposed that there is a technology that the paper-feeding unit is automatically recognized in the main body side in which the paper-feeding unit is mounted (see Japanese Laid-open Patent Application Publication No. 2002-255382 and Japanese Laid-open Patent Application Publication No. 2003-162181).

In both of the aforementioned Japanese Laid-open Patent Application Publication No. 2002-255382 and Japanese Laid-open Patent Application Publication No. 2003-162181, there is a configuration that the number of signal lines, which are required for controlling the paper-feeding units, increases in response to the number of paper-feeding units to be connected, and for N number of the paper feeding units, log2N signal lines are required in the aforementioned Japanese Laid-open Patent Application Publication No. 2002-255382 and N/2 signal lines are required in the aforementioned Japanese Laid-open Patent Application Publication No. 2003-162181.

With such configuration that the number of signal lines, which are required in response to the number of paper feeding units, increases, as the number of paper feeding units is higher, the cost for providing wirings in the main body side increases. Further, regardless the actual number of paper-feeding units to be connected by the user, as the product specification of the main body, it is required to have the number of wirings in a case that the maximum number of paper-feeding units are connected.

SUMMARY

The present invention was made to solve at least a part of the aforementioned problems, and a facsimile device, an option unit, and a control device in which the identification method of the option unit is improved are provided.

In one aspect of the present invention, a facsimile device is provided with a scanner unit configured to perform read-out of a document, a facsimile unit configured to execute a facsimile transmission of image data, which is generated by the read-out to an outside and a reception of image data that is facsimile-transmitted from the outside, a printing unit configured to print an image on a supplied paper based on the received image data, a paper-feeding unit configured to supply the paper, and a control part configured to communicate with each unit. One or more paper-feeding units are mounted as an upper position in a side approximating to the printing unit, and are provided with an upper side signal line connecting with the lower side signal line of the paper-feeding unit located in the upper position and a lower side signal line connecting with an upper side signal line of the paper-feeding unit located in the lower position. The potential of the upper side signal line until the initialization processing is completed is defined as the first potential, and when the potential of the lower side signal line becomes the second potential, the initialization processing starts. The potential of the upper side signal line after the initialization processing was completed is changed from the first potential to the second potential, and the initialization processing includes a processing for setting unique identification information, which is transmitted from the control part, in each of the paper-feeding units. The control part is configured to execute a paper-feeding instruction to the paper-feeding units by using the identification information in each of the paper-feeding units which is set, and the paper-feeding units are configured to supply the stored papers or the papers supplied from the paper-feeding unit located in the lower position to the paper-feeding unit located in the upper position or the printing unit.

According to the present invention, each paper-feeding unit mounted in the facsimile device starts the initialization processing in a condition that the potential of the lower side signal line is the second potential, and after the initialization processing was completed, the potential of the upper side signal line is changed from the first potential to the second potential so that the initialization processing is executed from the paper-feeding unit located in the lower position side. Therefore, regardless the number of the mounted paper-feeding units (option unit), the control part can identify these paper-feeding units by the identification information. Further, the control part can use a bus (common communication path) for the communication (transmission of identification information, etc.) in each paper-feeding unit, and therefore, a necessary signal line in response to the number of the connected paper-feeding units does not increase. Specifically, first, the paper-feeding unit located in the lowest position starts the initialization processing, and the potential of the upper side line after the initialization processing was completed, the potential of the upper side signal line is changed from the first potential to the second potential, and the potential of the lower side signal line of the paper-feeding unit located in the upper position becomes the second potential so that the initialization processing is executed in an order from the paper-feeding unit located in the lowest position to the paper-feeding unit located in the highest position. With such configuration, the initialization processing is executed in an order from the paper-feeding unit located in the lowest position, and eventually, the initialization processing is completed in all of the paper-feeding units.

In one aspect of the present invention, the control part is provided with the lower side signal line connecting with the upper side signal line of the paper-feeding unit located in the highest position, and when the potential of the lower side signal line is the second potential, the completion of the initialization processing in all of the paper-feeding units may be recognized.

With such configuration, the completion of the initialization processing in each paper-feeding unit mounted in the facsimile device can be easily and surely recognized.

In one aspect of the present invention, the lower side signal line of the paper-feeding unit may be connected with the power supply of the second potential through a resistance.

With such configuration, first, the paper-feeding unit located in the lowest position can surely starts the initialization processing.

In one aspect of the present invention, the control part may start the transmission of the identification information after a predetermined standby time which counts from the time that the power supply was applied to the facsimile device, and is required for booting the maximum number of the paper-feeding units being mounted in the facsimile device.

With such configuration, the transmission of the identification information starts in a state that the power supply to each paper-feeding unit is stably supplied so that the initialization processing of each paper-feeding unit is smoothly executed.

A technical idea of the present invention realizes not only the aforementioned facsimile device. As the relationship between the control part and the paper-feeding units, it is widely realized in the relationship between the control part (control device) for controlling a communication system and an option unit connected as a part of the communication system. As an example, in one or more option units connecting with the communication system including the control part for controlling a communication, an upper side signal line connecting with a lower side signal line of the option unit connected in the upper position, a lower side signal line connecting with an upper side signal line of the option unit connected in the lower position, and a control circuit are provided. A potential of the upper side signal line until an initialization processing is completed is defined as the first potential, and when the potential of the lower side signal line is the second potential, the control circuit starts the initialization processing, and after the initialization processing was completed, the potential of the upper side signal line is changed from the first potential to the second potential, and the initialization processing includes a processing for setting the unique identification information, which is transmitted from the control part, in each of the option units and a processing in response to the instruction from the control part by using the identification information which was set. This configuration may be considered as one of the inventions.

For example, the option unit is a paper-feeding unit that supplies papers to the printing unit, which is controlled by the communication from the control part, in response to the instruction from the control part.

Further, in a control device that controls one or more option units connecting with a communication system, a signal line connecting with the option unit connected in the highest position among the option units is provided. When a response that the identification information was set is obtained from any one of the option units through the communication system, a processing for transmitting the unique identification information through the communication system is repeated to the option units as an object. The option unit in which the identification information was set detects a potential change to be recognized for an upper position, and when the potential change is detected in the signal line, a completion for setting the unique identification information in all of the option units is recognized. This configuration may be considered as one of the inventions.

In one of different aspects of the present invention, a facsimile unit is provided with a scanner unit configured to perform read-out of a document, a facsimile unit configured to execute a facsimile transmission of image data generated by the read-out to an outside, and a reception of image data which is facsimile transmitted from the outside, a printing unit configured to print an image on a supplied paper based on the received image data, a paper-feeding unit configured to supply the paper, and a control part configured to communicate each unit. The control part is provided with a lower side signal line connecting with an upper side signal line of the paper-feeding unit located in the highest position among the paper-feeding units that are connected in series as an upper position approximating to the printing unit. The paper-feeding unit is provided with an upper side signal line connecting with the lower side signal line of the paper-feeding unit located in the upper position or the lower side signal line of the control part, and a lower side signal line connecting with the upper side signal line of the paper-feeding unit located in the lower position. The potential of the upper side signal line in an initial state is defined as the first potential, and the potential of the upper side signal line in a normal state is defined as the second potential which is different from the first potential, and the control part executes a paper-feeding instruction to the paper-feeding unit in the normal state, and the paper-feeding units supply the stored papers or the papers supplied from the paper-feeding unit located in the lower position to the paper-feeding unit located in the upper position or the printing unit in response to the paper-feeding instruction, and the control part detects an occurrence of abnormality in at least one of the paper-feeding units by changing the potential of the lower side signal line from the second potential.

According to the present invention, in each paper-feeding unit mounted in the facsimile device, the potential of the upper side signal line in an initial state is defined as the first potential, and the potential of the upper side signal line in a normal state is defined as the second potential which is different from the first potential. Therefore, an initialization processing is executed in an order from the paper-feeding unit located in the lowest position, and when the initialization processing is completed in all of the paper-feeding units, the potential of the lower side line of the control part also becomes the second potential. On the other hand, when an abnormality occurs in any of the paper-feeding units, the potential of the upper side signal line of the paper-feeding unit is changed from the second potential and the change is transmitted to the upper position. Accordingly, the control part can promptly detect the occurrence of the abnormality in at least one of the paper-feeding units by changing the potential of the lower side signal line from the second potential. Also, according to the present invention, the control part does not have to provide dedicated control wires connecting with the respective paper-feeding units for detecting an abnormality in each of the paper-feeding units so that the cost required for the detection of abnormality can be suppressed.

In one aspect of the present invention, the paper-feeding unit is provided with the upper side signal line and a connection circuit connecting with the lower side signal line. The connection circuit may change the potential of the upper side signal line from the second potential in response to the potential change of the lower side signal line from the second potential because the abnormality occurs in the paper-feeding unit located in the lower position.

With such configuration, the paper-feeding unit can surely and promptly transmit the potential change, which is caused by the abnormality in the paper-feeding unit located in the lower position, to the upper position.

In one aspect of the present invention, the connection circuit is provided with a switch configured to perform switching of the potential of the upper side signal line from the second potential, and a power supply unit configured to supply the power supply required for the operation of the switch. The power supply unit starts supplying the power supply when the paper-feeding unit becomes in the normal state, and the switch may execute the switching in response to the potential change from the second potential of the lower side signal line.

With such configuration, the paper-feeding unit becomes a state that is capable of transmitting the potential change, which is caused by the occurrence of the abnormality in the paper-feeding unit located in the lower position, to the upper position after the initialization processing was completed.

A technical idea of the present invention realizes not only the aforementioned facsimile device. As the relationship between the control part and the paper-feeding units, it is widely realized in the relationship between the control part (control device) for controlling a communication system and an option unit connected as a part of the communication system. As an example, in one or more option units connecting with a communication system including the control part configured to control a communication, an upper side signal line connecting with a lower side of the option unit connected in the upper position or a lower side signal line provided in the control part, a lower side signal line connecting with the upper side signal line of the option unit connected in the lower position, and the control circuit are provided. The potential of the upper side signal line in an initial state is defined as the first potential and the potential of the upper side signal line in a normal state is defined as the second potential which is different from the first potential, and the control circuit changes the potential of the upper side signal line from the second potential in response to the potential change, which is caused by the occurrence of the abnormality in the option unit located in the lower position, from the second potential of the lower side signal line. This configuration can be considered as one of the inventions.

For example, the option unit is the paper-feeding unit that supplies papers to the printing unit, which is controlled by a communication from the control part, in response to the instruction from the control part.

Further, in a control device that controls a communication system connecting with one or more option units, a signal line connecting with the option unit connected in the highest position amount the option units connected in series is provided, and the occurrence of the abnormality in at least one of the option units is detected by the potential change of the signal line. This configuration may be considered as one of the inventions.

A system including the option units and the control part (control device) is one of the inventions, and such system may be provided in one individual product or may be provided in a plurality of products. Further, the present invention may be realized by various categories such as each method providing processing steps to execute each of the facsimile device, the option unit, and the control part (control device), computer programs to execute these steps in the methods by a hardware (computer), and a computer readable medium recording programs, etc.

BRIEF DESCRIPTION OF THE DRAWINGS

Referring now to the attached drawings which form a part of this original disclosure.

DETAILED DESCRIPTION OF EXEMPLARY EMBODIMENTS

An embodiment of the present invention will be described in accordance with the following order: 1. Outline of device configuration, 2. Identification information setting of optical unit, 3. Abnormality detection for optical unit, and 4. Other embodiments.

1. Outline of Device Configuration

Figure 1:
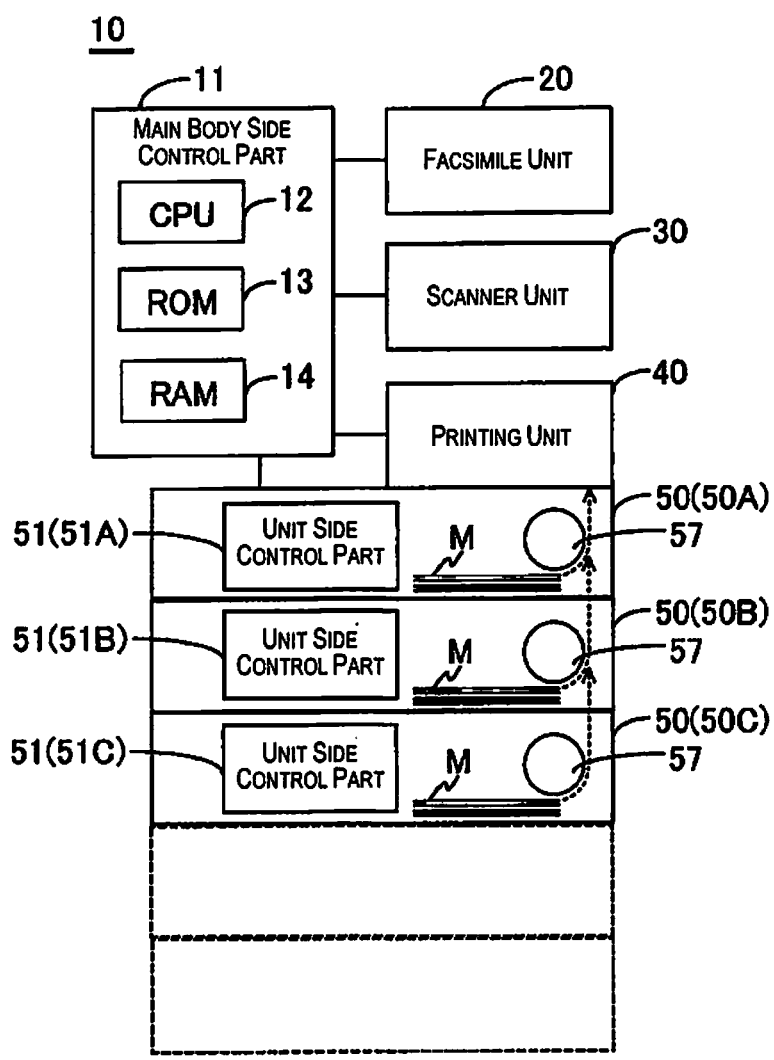
FIG. 1 is an illustration schematically showing a configuration of a device according to the present embodiment.

FIG. 1 schematically shows a configuration of a facsimile device 10 according to the present embodiment. The facsimile device 10 is called as a multifunction device 10. The multifunction device 10 is provided with a main body side control part 11, a facsimile unit 20, a scanner unit 30, and a printing unit 40 (hereinafter referred to as main body).

Further, the multifunction device 10 is provided with one or more paper-feeding units 50 as one type of "option unit" which are capable of being added by the user to the main body. The paper feeding unit 50 may be called as a paper-feeding cassette, etc. In FIG. 1, it shows an example that three paper feeding units 50 are mounted.

When they are mounted in the multifunction device 10, the paper-feeding unit 50 located in the position approximating to the printing unit 40 is also shown as a paper-feeding unit 50A, one below the paper-feeding unit 50A is also shown as a paper-feeding unit 50B, and one below the paper-feeding unit 50B is also shown as a paper-feeding unit 50C. Further, the paper-feeding units 50 may be added in a position below the paper-feeding unit 50C (see additional paper-feeding units shown in rectangular shape in broken line). When an upper position and a lower position of the paper-feeding units 50 with respect to the printing unit 40 are called, a position approximating to the printing unit 40 is considered as the upper position. However, it does not mean up and down in a vertical direction, high or low in priority order, etc. Needless to say, the paper-feeding unit located in the upper position which approximates to the printing unit 40 may be positioned in the upper side in a vertical direction or it may have high priority.

In the main body side control part 11, the CPU 12 controls the behavior of the multifunction device 10 by, for example, developing programs stored in a ROM 13 to a memory such as a RAM 14 and carrying out operations in accordance with the programs. The main body side control part 11 corresponds to an example of "control part" or "control device" in a scope of claim for patent. The main body side control part 11 is communicably connected to the facsimile unit 20, the scanner unit 30, the printing unit 40, and the paper-feeding units 50, and controls the facsimile unit 20, the scanner unit 30, the printing unit 40, and the paper-feeding unit 50.

The facsimile unit 20 is provided with a facsimile communication line (not shown) connecting with a modem. The facsimile unit 20 executes receiving a facsimile transmission of image data from outside through the communication line and decompressing the received image data, or compressing image data generated by reading out by the scanner unit 30 and a facsimile transmission of the image data after the compression to the outside through the communication line based on an instruction of the main body side control part 11.

The scanner unit 30 reads out a document set in a platen or an Auto Document Feeder (ADF), etc. by an optical sensor and generates the image data of the document (e.g., bitmap data) based on an instruction of the main body side control part 11. The image data generated by the scanner unit 30 becomes an object printed by the printing unit 40 and becomes an object for a facsimile transmission by the aforementioned facsimile unit 20.

The printing unit 40 is the unit (print engine) that performs printing of an image by using color materials such as ink or toner to a paper. The printing unit 40 performs printing based on image data received and decompressed by the facsimile unit 20, image data generated by the scanner unit 30, and other image data received from image data input sources that is not shown (personal computer (PC), portable terminal, digital still camera, etc. connected to the multifunction device 10) based on an instruction from the main body side control part 11. A paper-feeding tray that is not shown may be provided in the printing unit 40. That is, the printing unit 40 performs printing on papers stored in the paper-feeding tray provided in the unit itself or papers M supplied from the paper-feeding unit 50. Accordingly, as the multifunction device 10, even if the paper-feeding unit 50 is not mounted, an operation is normally performed in only the main body side. However, as described above, in the present embodiment, one of more paper-feeding units 50 are mounted in the multifunction device 10.

Each of the paper-feeding units 50 has the same configuration, and it is provided with a unit side control part 51, and a roller 57. The unit side control part 51 controls an operation of the roller 57, etc. based on an instruction from the main body side control part 11. The paper-feeding unit 50 stores papers M in a built-in tray, and the papers M are supplied to the upper side by rotating the roller 57. In an example shown in FIG. 1, the paper-feeding unit 50C, which is located in the lowest position, supplies the papers M, which were stored in the unit itself, to the paper-feeding unit 50B which is located in the upper position. The paper-feeding unit 50B supplies the papers M, which were stored in the unit itself, or the papers M, which were supplied from the paper-feeding unit 50C located in the lower position, to the paper-feeding unit 50A which is located in the upper position. The paper-feeding unit 50A, which is located in the highest position, supplies the papers M, which were stored in the unit itself, or the papers M, which are supplied from the paper-feeding unit 50B located in the lower position, to the printing unit 40. In FIG. 1, the flow of the papers M is shown by arrows in broken line (see the aforementioned Japanese Laid-open Patent Application Publication No. 2002-255382).

Hereinafter, the unit side control part 51 provided in the paper-feeding unit 50A is also shown as a unit side control part 51A. The unit side control part 51 provided in the paper-feeding unit 50B is also shown as a unit side control part 51B. The unit side control part 51 provided in the paper-feeding unit 50C is also shown as a unit side control part 51C. The multifunction device 10 has a display part which is not shown (liquid crystal panel, etc.) or control parts (buttons, keys, touch panel, etc.) for receiving various instructions from the user or providing a status of the multifunction device 10 to the user. A call (phone) function may be provided in the multifunction device 10.

2. Identification Information Setting of Option Unit

In view of the aforementioned configuration, an identification information (ID) setting processing of an option unit will be described.

Figure 2:
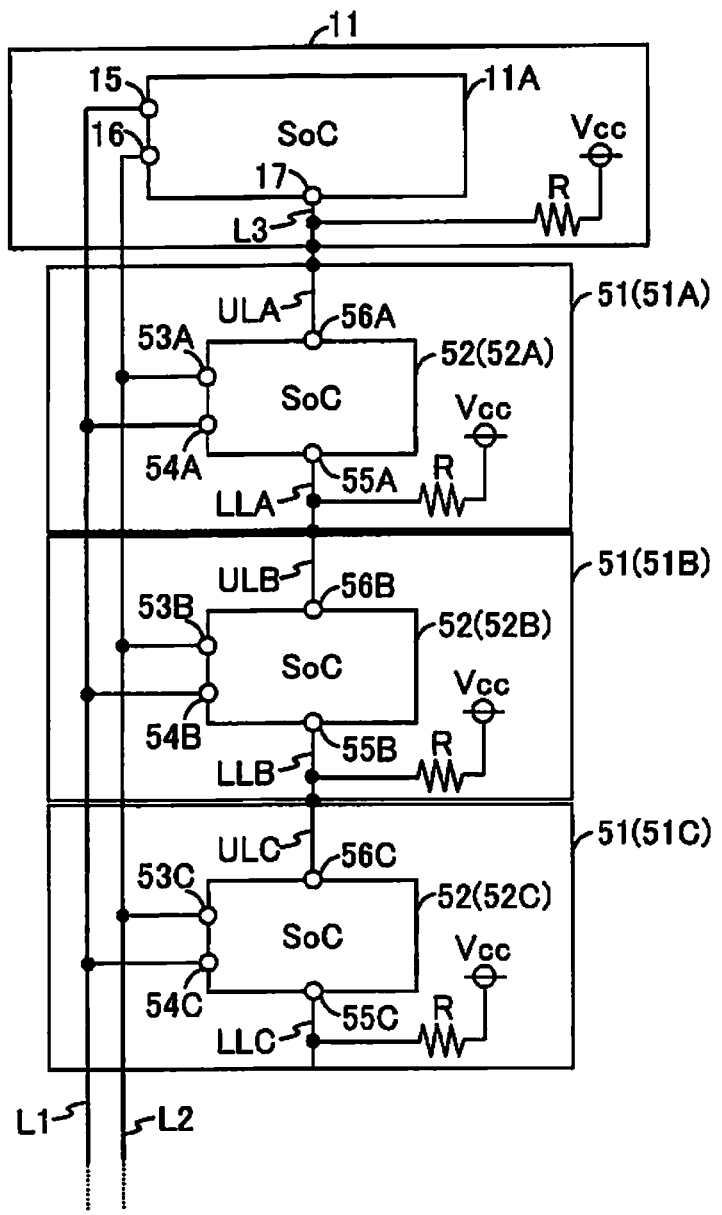
FIG. 2 is an illustration exemplifying a connection aspect between unit side control parts.

FIG. 2 exemplifies a connection aspect, etc. between the unit side control parts 51 (51A, 51B, 51C). All of the unit side control parts 51 (51A, 51B, 51C) have the same configuration and it has a SoC (System-on-a-Chip) 52 (52A, 52B, 52C) in which a processor, memory, etc., which are required for realizing the functions as an unit side control part 51, become one chip. The SoC 52 corresponds to an example of "control circuit" in a scope of claim for patent, and it is provided with at least a transmitting (Tx) terminal (53A, 53B, 53C) for a Universal Asynchronous Receiver Transmitter (UART) communication, a receiving (Rx) terminal (54A, 54B, 54C) for the UART communication, a lower side input terminal (55A, 55B, 55C), and an upper side output terminal (56A, 56B, 56C). The transmitting terminals 53A, 53B, 53C, the receiving terminals 54A, 54B, 54C, the lower side input terminals 55A, 55B, 55C, the upper side output terminals 56A, 56B, 56C are sometimes simplified and shown as a transmitting terminal 53, a receiving terminal 54, a lower side input terminal 55, and an upper side output terminal 56 (see FIG. 4).

Also, in FIG. 2, SoC 11A (e.g., SoC in which CPU 12, ROM 13, RAM 14, etc. become one chip) that mainly performs the functions of the main body side control part 11 is exemplified, and the SoC 11A is provided with at least a transmitting (Tx) terminal 15 for UART communication, a receiving (Rx) terminal 16 for UART communication, and a lower side input terminal 17. A signal line L1 extends from the transmitting terminal 15 of the SoC 11A, and a signal line L2 extends from the receiving terminal 16 of the SoC 11A. As shown in the drawing, when the paper-feeding unit 50 is mounted in the multifunction device 10, the transmitting terminal 53 provided in the unit side control part 51 of the paper-feeding unit 50 is connected to the signal line L2, and the receiving terminal 54 provided in the unit side control part 51 of the paper-feeding unit 50 is connected to the signal line L1.

That is, an environment (kind of a communication system) for performing a UART communication between the main body side control part 11 and each of the unit side control parts 51A, 51B, 51C is constructed by connecting the transmitting terminal 15 of the SoC 11A to the receiving terminals 54A, 54B, 54C in each of the unit side control parts 51A, 51B, 51C through the signal line L1 and by connecting the receiving terminal 16 of the SoC 11A to the transmitting terminals 53A, 53B, 53C in each of the unit side control parts 51A, 51B, 51C through the signal line L2.

Lower side signal lines (LLA, LLB, LLC) extend from the lower side input terminals 55A, 55B, 55C that are provided in the SoC 52A, 52B, 52C, and upper side signal lines (ULA, ULB, ULC) extend from the upper side output terminals 56A, 56B, 56C that are provided in SoC 52A, 52B, 52C. A lower side signal line L3 extends from the lower side input terminal 17 provided in the SoC 11A. There is a configuration that any of the lower side signal lines L3, LLA, LLB, LLC is pulled-up to a predetermined high (H) level by, for example, 3.3V power supply Vcc through a resistance R. The upper side signal lines ULA, ULB, ULC, and the lower side signal lines LLA, LLB, LLC are sometimes simplified and shown as an upper side signal line UL, a lower side signal line LL (see FIG. 4).

When the paper-feeding unit 50 is mounted in the multifunction device 10, the lower side signal line LL provided in the unit side control part 51 of the paper-feeding unit 50 is connected to the upper side signal line UL provided in the unit side control part 51 of the paper-feeding unit 50 which is located in the lower position, and the upper side signal line UL provided in the unit side control part 51 of the paper-feeding unit 50 is connected to the lower side signal line LL provided in the unit side control part 51 of the paper-feeding unit 50 which is located in the upper position. Specifically, as shown in FIG. 2, the upper side signal line ULC of the unit side control part 51C, which is located in the lowest position in the connecting order, is connected to the lower side signal line LLB of the unit side control part 51B which is located in a position one above the unit side control part 51C. The upper side signal line ULB of the unit side control part 51B is connected to the lower side signal line LLA of the unit side control part 51A which is located in a position one above the unit side control part 51B. The upper side signal line ULA of the unit side control part 51A which is located in the highest position in the connecting order is connected to the lower side signal line L3 of the SoC 11A.

The terminal provided in the SoC 52 is not limited to the terminal shown in the drawing. As the specification of the SoC 52, it may be provided with a power supply input terminal for receiving the supply of the power supply voltage for operation, a GND terminal for connecting to the ground, an interruption signal output terminal for outputting a required interruption signal to the SoC 11A, a terminal for transmitting a result detected by a kind of sensor (sensor for detecting a size, a type, etc. of the papers M, sensor for detecting insertion or pulling out a tray, sensor for detecting paper jam, etc.) capable of being provided in the paper-feeding unit 50, etc.

Figure 3:
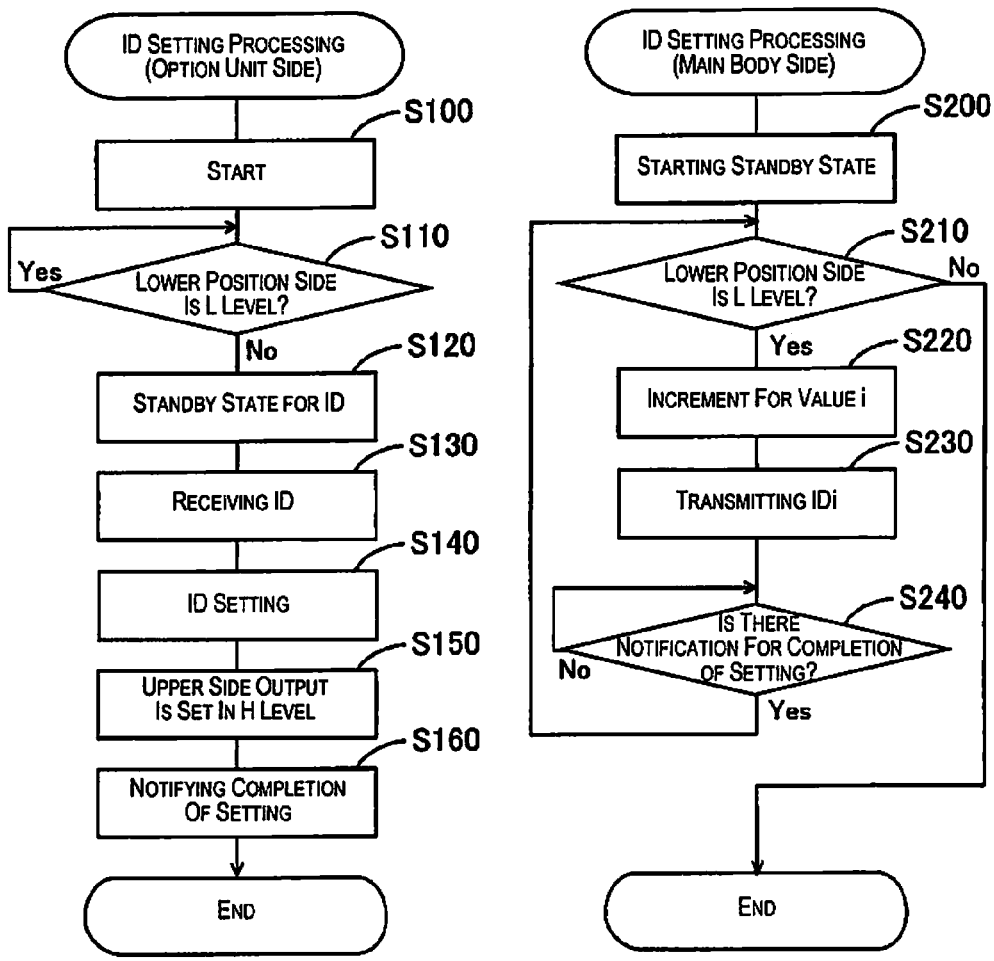
FIG. 3 is a flowchart showing an identification information setting processing.

FIG. 3 shows the flowchart of a processing in an option unit (paper-feeding unit 50) side and a processing in the main body side control part 11 side for an identification information (ID) setting processing. The SoC 52 of the unit side control part 51 in each of the paper-feeding units 50 mainly executes the processing in the option unit side, and the SoC 11A executes the processing in the main body side control part 11 side. These processing basically execute every time the power supply of the multifunction device 10 is applied.

Initially, when the power supply of the multifunction device 10 is applied, the SoC 11A boots from a sleep state. The SoC 11A starts supplying a power-supply voltage to each unit (facsimile unit 20, scanner unit 30, printing unit 40, paper-feeding unit 50, . . . ) provided in the multifunction device 10 from a power supply circuit by controlling the power supply circuit (not shown) provided in the multifunction device 10, and after that, it becomes in a standby state for a predetermined time (Step S200). The phrase "predetermined time" described above is the necessary time for starting the maximum number of the paper-feeding units 50 capable of being mounted in the multifunction device 10 from the time when the power supply is applied to the multifunction device 10, and it is preliminary set. The number of the paper-feeding units 50 mounted in the multifunction device 10 is any number desired by the user within the aforementioned maximum number (e.g., 5 paper-feeding units). However, by proceeding to Step 210 and the following steps after waiting for the predetermined time, the ID setting, which will be described later, for all of the paper-feeding units 50, which are actually mounted in the multifunction device 10, can be smoothly performed.

On the other hand, each of the paper-feeding units 50 starts within the predetermined time by receiving the power supply from the power supply circuit. That is, each part becomes in an operable state by starting the SoC 52 of the unit side control part 51 and also, by generating the power supply, which is required for the operation of each part (roller 57, etc.) in the paper-feeding unit 50. At this point, each of the paper-feeding units 50 switches the upper side output terminal 56 (56A, 56B, 56C) to a predetermined low (L) level.

Next, in the paper-feeding unit 50, the SoC 52 determines whether or not the potential of the lower side signal line LL is a predetermined L level (whether it is H level) (Step S110). The L level is an example of "the first potential", and the H level is an example of "the second potential". However, it is acceptable if there is a clear difference between the first potential and the second potential so that in view of the concept of the invention, it is not essential if the second potential has higher potential. In the present embodiment, the SoC 52 maintains the L level in the output (potential of the upper side signal line UL) from the upper side output terminal until the initialization processing is completed, and it switches to the H level in the output when the initialization processing is completed. Accordingly, when the potential of the lower side signal line LL is the L level, the output from the upper side output terminal 56 of the paper-feeding unit 50 located in the lower position is the L level, and this means that the initialization processing of the paper-feeding unit 50 located in the lower position is not completed. On the other hand, when the potential of the lower side signal line LL is the H level, this means that the initialization processing of the paper-feeding unit 50 located in the lower position is completed, or the paper-feeding unit 50 located in the lower position is originally not existed (because the lower side signal line LL is pulled-up to the H level).

The initialization processing of the paper-feeding units 50 is the processing including at least the ID setting which will be described later. In the determination of Step S110, it detects the potential of the lower side input terminal 55. When the potential of the lower side signal line LL is the L level, the SoC 52 repeats the determination of Step S110 until the potential of the lower side signal line LL becomes the H level. When the SoC 52 determines that the potential of the lower side signal line LL is the H level, it proceeds to Step S120 and the following steps. The paper-feeding unit 50 in which the processing proceeds to Step S120 shifts to a standby state for ID.

In the main body side control part 11, the SoC 11A determines whether or not the potential of the lower side signal line L3 is the L level (whether it is the H level) (Step S210). The determination is performed by detecting the potential of the lower side input terminal 17. When the potential of the lower side signal line L3 is the L level, this means that at least the initialization processing of the paper-feeding unit 50 located in the highest position is not completed so as to proceed to Step S220. On the other hand, when the potential of the lower side signal line L3 is the H level, it recognizes that the initialization processing of all of the paper-feeding units 50 is completed, and the SoC 11A completes the flowchart in FIG. 3.

In Step S220, the SoC 11A adds 1 to value i which indicates the number of the paper-feeding units 50 mounted in the multifunction device 10 (increment).

In Step S230, the SoC 11A transmits i-th ID (IDi) attached with a specific header, which describes the ID for the paper-feeding unit 50 in the standby state for ID, from the transmitting terminal 15. The IDi may be unique information in each of the paper-feeding units 50, and it may be numbers, etc., which is preliminary determined in response to the value i, or a random number, etc. may be newly generated every time in Step S230. The IDi transmitted in Step S230 reaches to the SoC 52 of all of the unit side control parts 51 in which the receiving terminal 54 is connected to the signal line L1.

By reading the specific header, the SoC 52 of the paper-feeding unit 50 recognizes that the ID was transmitted to the paper-feeding unit 50 which is in the standby state for ID, and only if the part itself is currently in the standby state for ID (Step S120), the IDi attached with the specific ID is received (Step S130). In the SoC 52 in which the IDi was received, the received IDi is used as the ID to identify the part itself (paper-feeding unit 50 having the part itself), and it is stored (set) in a predetermined memory (Step S140).

The SoC 52 in which the initialization processing including the ID setting of Step S140 is completed switches the output (the potential of the upper side signal line UL), which is transmitted from the upper side output terminal 56, to the H level (Step S150), and the processing that the IDi setting is completed is notified to the SoC 11A (Step S160). Therefore, the SoC 52 is released from the standby state for ID, and the processing for ID setting is completed. The notification in Step S160 is transmitted from the transmitting terminal 53 connected to the signal line L2. With such aforementioned processing, the initialization processing including the ID setting for one paper-feeding unit 50 is completed. As the initialization processing, other than the aforementioned ID setting, the processing includes that for example, the size or the type of papers M stored in the paper-feeding unit 50, the existence or non-existence of paper jam, other conditions of the paper-feeding unit 50 may be notified to the SoC 11A through the signal line L2. In this case, in response to the instruction from the SoC 11A in which the setting ID is used, such condition of the paper-feeding unit 50 may be notified to the SoC 11A.

In the main body side control part 11, the SoC 11A waits for receiving a notification of the completion for setting the IDi issued in Step S160 (Step S240), and when the notification is received by the receiving terminal 16, Step S210 and the following steps are repeated. Further, by receiving such notification that the setting of the IDi is completed, the SoC 11A recognizes the existence of the paper-feeding unit 50 in which the IDi was set.

The processing described in FIG. 3 will be specifically described in reference to the configurations in FIGS. 1 and 2. At the time after the standby condition of Step S200 was completed, initially, the potential of the lower side signal line LLC of the paper-feeding unit 50C located in the lowest position is the H level, and the potential of the lower side signal lines LLB, LLA of the paper-feeding units 50B, 50A and the lower side signal line L3 of the main body side control part 11 is the L level. Therefore, the paper-feeding unit 50C is only in a standby state for ID (Step S120). Accordingly, ID1 is set in the paper-feeding unit 50C (Steps S220, S230, S130, S140).

Next, the paper-feeding unit 50C switches the potential of the upper side output terminal 56C from the L level to the H level (Step S150). Therefore, the potential of the lower side signal line LLB of the paper-feeding unit 50B also becomes the H level (the potential of the lower side signal line LLA and the lower side signal line L3 stays in the L level) so that the paper-feeding unit 50B is only in the standby state for ID. Accordingly, the ID2 is set in the paper-feeding unit 50B (Steps S220, S230, S130, and S140).

Next, the paper-feeding unit 50B switches the potential of the upper side output terminal 56B to the H level (Step S150). Therefore, the potential of the lower side signal line LLA of the paper-feeding unit 50A also becomes the H level (the potential of the lower side signal line L3 stays the L level) so that the paper-feeding unit 50A is only in the standby state for ID (Step S120). Accordingly, ID3 is set in the paper-feeding unit 50A (Steps S220, S230, S130, and S140).

Next, the paper-feeding unit 50A switches the output of the upper side output terminal 56A to the H level (Step S150). Therefore, the potential of the lower side signal line L3 of the main body side control part 11 becomes the H level so that it is determined as the H level in Step S210. With such aforementioned processing, the main body side control part 11 (SoC 11A) can confirm the setting of total three IDs (Step S240) so that it can be determined that all three paper-feeding units 50 are mounted in the multifunction device 10, and therefore, the paper-feeding unit 50 (50C) located in the lowest position can be identified as the first ID (ID1), and the paper-feeding unit 50 (50B) located in the next upper position can be identified as the second ID (ID2), and the paper-feeding unit 50 (50A) located in the highest position can be identified as the third ID (ID3). Accordingly, the ID setting processing is completed.

Hereinafter, the main body side control part 11 (SoC 11A) specifies the paper-feeding unit 50 of a communication partner and executes the UART communication with each of the paper-feeding units 50 through the signal lines L1, L2 by using the ID in each of the paper-feeding units 50. For example, the main body side control part 11 (SoC 11A) performs a paper feeding instruction (transmitting a paper feeding command) to each of the paper-feeding units 50 by using the ID in each of the paper-feeding units 50. When the paper-feeding unit 50 receives the paper feeding command with the ID specifying itself, the stored papers M or the papers M supplied from the paper-feeding unit 50 located in the lower position are supplied to the paper-feeding unit 50 located in the upper position or the printing unit 40 in response to the paper feeding command.

According to the present embodiment, the ID setting of the paper-feeding units 50 was executed one by one from the lower position to the upper position so that there is a configuration to transmit from the lower position to the upper position through the upper side signal line UL and lower side signal line LL provided in the paper-feeding unit 50 and the lower side signal line L3 provided in the main body side control part 11. Therefore, in the multifunction device 10, regardless the number of the paper-feeding units 50 arbitrarily mounted by the user, the unique ID is automatically set in an order from the paper-feeding unit 50 located in the lowest position to the paper-feeding unit 50 located in the highest position, and after that, the operation can be controlled while surely identifying each of the paper-feeding units 50. Accordingly, the ID can be set without troubling a user, and the occurrence of the erroneous ID setting can be prevented.

Further, a notification for transmitting the ID to each of the paper-feeding units 50 (Step S230) and for completing the ID setting (Step S160), or a communication between the main body side control part 11 and each of the paper-feeding units 50 after the ID setting is performed through the common signal lines L1 and L2. Therefore, it is not required to add the number of signal lines which are required for setting the ID or controlling the paper-feeding units 50 in response to the number of the paper-feeding units 50 to be connected, and it prevents the cost rise (increasing costs for product specification) from realizing additional option units or communication with an option unit.

Switching the output (potential of the upper side signal line UL), which is transmitted from the upper side output terminal 56, from the L level to the H level may be performed at the timing of the middle of the aforementioned initialization processing by the SoC 52 of the paper-feeding unit 50 so that it is not necessary to be switched at the timing after the aforementioned initialization processing was completed. For example, as described above, if the ID setting processing is a part of the initialization processing, the SoC 52 may perform switching the output, which is transmitted from the upper side output terminal 56, from the L level to the H level at the timing that the ID is set but the initialization processing is not completed. Further, for a condition of the paper-feeding units 50, in a state of performing a part or an entire processing until the initialization processing is completed, it is called as an initial state. After the initialization processing was completed, it is called as a normal state (except abnormal state which will be described later).

3. Abnormality Detection for Optical Unit

Next, an abnormality detection processing executed in the multifunction device 10 in which the initialization processing of the option units including the aforementioned ID setting is completed will be described. The option units such as the paper-feeding units 50, etc., may individually reset in a case of an occurrence of abnormality in the aforementioned supplied power supply voltage and a logic power supply, etc. generated inside the unit side control part 51, an electrostatic generation, etc. (stopping the operation and returning to the initial state). With such reset state, it is a kind of abnormal state. In this case, in the main body side, the reset (occurrence of abnormality in any of the option units) is detected as early as possible, and it is required to perform a processing such that the entire device including other option units, which do not reset, is safely stopped, etc.

Figure 4:
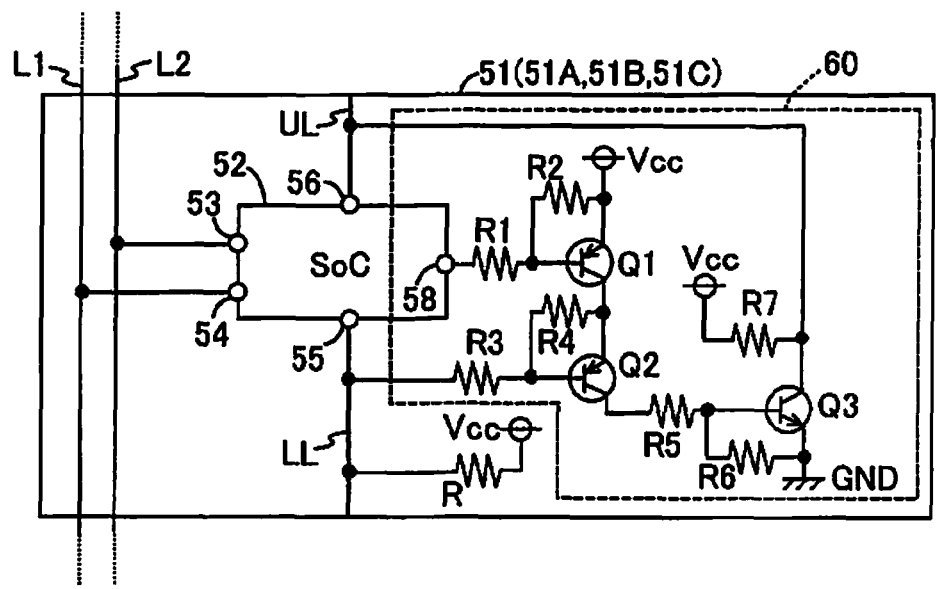
FIG. 4 is an illustration exemplifying the unit side control part having a connection circuit.

FIG. 4 exemplifies the unit side control part 51 having a connection circuit 60 for the abnormality detection processing. The connection circuit 60 is provided in the same configuration inside all of the paper-feeding units 50A, 50B, 50C (all of the unit side control parts 51A, 51B, 51C). The connection circuit 60 is provided to connect the upper side signal line UL and the lower side signal line LL in the unit side control part 51. In outline, in response to the potential change of the lower side signal line LL caused by the abnormality (reset) in the paper-feeding unit 50 located in the lower position, the connection circuit 60 changes the same potential change to the upper side signal line UL.

Specifically, the SoC 52 has an enable terminal 58. In the connection circuit 60, the PNP-type transistor Q1 is connected to the enable terminal 58 through a base and a resistance R1. In the transistor Q1, an emitter connects to, for example, 3.3V power supply Vcc, and a resistance R2 connects between the base and the emitter. Also, in the connection circuit 60, the PNP-type transistor Q2 is connected to the lower side signal line LL through the base and the resistance R3. In the transistor Q2, an emitter connects to a collector of the transistor Q1, and a resistance R4 connects between the base and the emitter.

In addition, in the connection circuit 60, the NPN-type transistor Q3 is connected to a collector of the transistor Q2 through a base and a resistance R5. In the transistor Q3, the emitter connects to a ground GND, and a resistance R6 connects between the base and the emitter. The collector of the transistor Q3 connects to, for example, the 3.3V power supply Vcc through the resistance R7. Further, the collector of the transistor Q3 connects to the upper side signal line UL.

With such configuration, SoC 52 maintains the enable terminal 58 in Hi-Z (invalid state) until the aforementioned initialization processing is completed, and when the aforementioned initialization processing is completed (when it becomes a normal state), the enable terminal 58 switches the output to the L level. Therefore, when the aforementioned initialization processing is completed, the transistor Q1 is turned on so as to start the power supply to the transistor Q2 (in a state that the transistor Q2 becomes operable).

As described above, after the aforementioned initialization processing is completed, the potential of the lower side signal line LL maintains to the H level. However, the unit side control part 51 (SoC 52) of the paper-feeding unit 50 again returns in a state (initial state) before the aforementioned initialization processing is performed when the part itself resets, and therefore, the output of the upper side output terminal 56 becomes the L level again. Accordingly, when any of the paper-feeding units 50 (e.g., paper-feeding unit 50C) resets, the output of the upper side output terminal 56 of the paper-feeding unit 50 (paper-feeding unit 50C) switches to the L level, and accordingly, the potential of the lower side signal line LL of the paper-feeding unit 50 (paper-feeding unit 50B) located in one upper position of the paper-feeding unit 50 (paper-feeding unit 50C) also becomes the L level.

The base of the transistor Q2 connects to the lower side signal line LL, and the transistor Q2 maintains the off-state while the potential of the lower side signal line LL keeps the H level. On the other hand, when the potential of the lower side signal line LL becomes the L level, the transistor Q2 changes to the on-state. For example, in the connection circuit 60 provided in the paper-feeding unit 50B, when the paper-feeding unit 50C existed in the lower position resets, the transistor Q2 becomes the on-state. When the transistor Q2 becomes the on-state, the transistor Q3 becomes the on-state by raising the potential of the base of the transistor Q3 in response to the voltage dividing ratio of the resistances R5 and R6. Therefore, the potential of the signal line, which connects to the collector of the transistor Q3, becomes the L level by pulling to the ground GND, and at the same time, the potential of the upper side signal line UL also becomes the L level.

After that, the same switching (transistors Q2 and Q3 turn on) is generated in the connection circuit 60 of the paper-feeding unit 50 located in one upper position (paper-feeding unit 50A). It can be said that such transistors Q2 and Q3 provided in the connection circuit 60 function as a switch for switching from the potential of the upper side signal line UL to the second potential (switching from the H level to the L level) in response to the potential change from the second potential of the lower side signal line LL (changing from the H level to the L level), and the transistor Q1 functions as a power supply unit for supplying the necessary power supply for the operation of the switch (transistor Q2).

As shown in FIG. 2, with respect to the lower side input terminal 17 of the main body side control part 11 (SoC 11A) as a starting point, the unit side control parts 51 (SoC 52) in the respective paper-feeding units 50 are connected in series through the lower side signal line L3, the upper side signal line UL (ULA, ULB, ULC) and the lower side signal line LL (LLA, LLB, LLC). With such configuration that the aforementioned connection circuit 60 is provided in each of the unit side control parts 51, when any one of the respective unit side control parts 51 (SoC 52), which are connected in series, resets, the potential change of the upper side output terminal 56 of the paper-feeding cassette 50 in accordance with the reset is transmitted in the order of the respective paper-feeding units 50 connected in the upper position. Accordingly, the main body side control part 11 (SoC 11A) can surely and promptly detect the an occurrence of an abnormality in at least one of the paper-feeding units 50 by observing the potential change (changing from the H level to the L level) of the lower side signal line L3 connected to the upper side signal line UL of the paper-feeding unit 50 located in the highest position in the lower side input terminal 17.

It is possible that the main body side control part 11 (SoC 11A) repeatedly inquires a current status (existence or non-existence of an abnormality) to each of the paper-feeding units 50 by interruption while performing various normal operations related to the multifunction device 10. The main body side control part 11 can detect the existence or non-existence of an abnormality by obtaining a response from the paper-feeding units 50 side for the inquiries. The abnormality detection based on these inquiries had a problem of the promptness because it relies on an interval of the inquiries. On the other hand, according to the method by using the aforementioned connection circuit 60, the inquiries are not transmitted from the main body side control part 11 (SoC 11A) to each of the paper-feeding units 50, but when any one of the paper-feeding units 50 performs a reset (abnormality), the potential change in accordance with the occurrence of abnormality is immediately transmitted to the main body side control part 11 (SoC 11A) through the connection circuit 60 of each of the paper-feeding units 50. Therefore, it can be said that the promptness related to the abnormality detection is excellent.

Further, according to the present embodiment, each of the paper-feeding units 50 is provided with the connection circuit 60, and therefore, the wirings for the aforementioned abnormality detection are completed by only mounting the paper-feeding units 50 in the multifunction device 10. Therefore, it is not necessary to provide dedicated control wires to connect to the respective paper-feeding units 50 for detecting an abnormality in each of the paper-feeding unit 50 in the main body side of the multifunction device 10 including the main body side control part 11, and the cost for the wirings to detect an abnormality can be suppressed.

Figure 5:
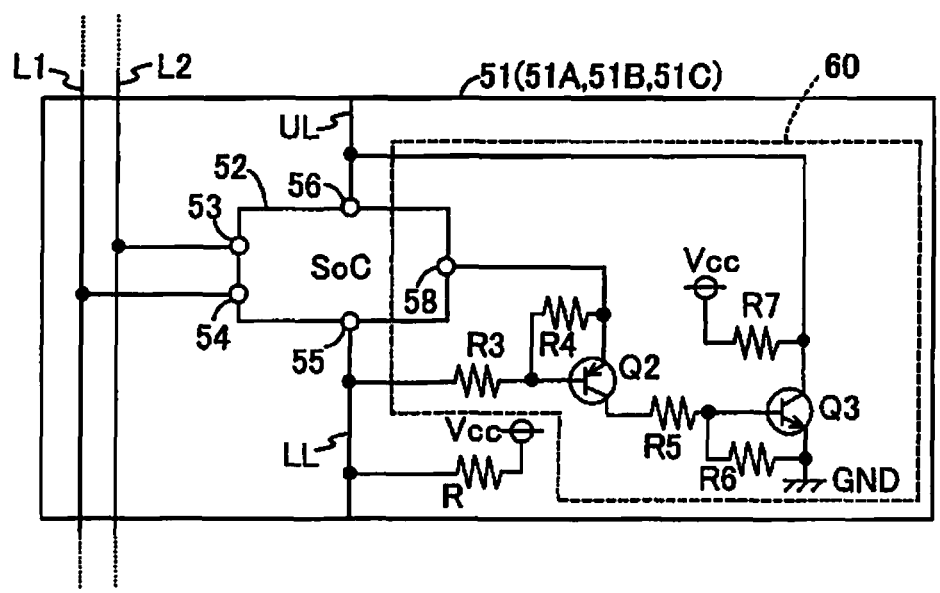
FIG. 5 is an illustration exemplifying the unit side control part having a connection circuit according to another example.

The concrete configuration of the connection circuit 60 is not limited the configuration shown in FIG. 4, and for example, it may be the configuration shown in FIG. 5. In the connection circuit 60 shown in FIG. 5, the transistor Q1 is omitted, and the enable terminal 58 is directly connected to the transistor Q2. In the configuration shown in FIG. 5, when the aforementioned initialization processing is completed, the enable terminal 58 starts supplying the power supply voltage, which is the level of voltage capable of operating the transistor Q2. That is, the enable terminal 58 functions as a power supply unit to supply the necessary power supply for the operation of the switch (transistor Q2).

4. Other Embodiments

The present invention is not limited to the aforementioned embodiments, and it is possible to actualize various structures unless it deviates from the spirits of the invention, and for example, the following embodiments described later can be employed. A configuration combining the respective embodiments is included in the discloser of the present invention.

A communication system configured between the main body side control part 11 and the unit side control part 51 is not limited to the UART communication. For example, in the communication system, other serial communication such as I2C (Inter-Integrated Circuit) communication, etc. may be employed. When the I2C communication is employed, one of the signal lines L1, L2 is used for the transmission of a clock signal, and the other one is used for the transmission of a data signal. Further, in the communication system, a USB (Universal Serial Bus) communication, etc. may be employed. In addition, these communications may be a wireless communication.

In a case that the option units are recognized as the paper-feeding units 50 as described above, when a product is capable of installing the paper-feeding units 50, the present invention can be applied. That is, the product in which the present invention can be applied may be products such as a printer, etc. which requires a paper feeding and is not a facsimile device or a multifunction device.

The aforementioned communication system may be configured in the individual product such as a facsimile device, a multifunction device, a printer, etc. or may be configured in multiple products or devices. Further, the option unit is not limited to the paper-feeding unit. That is, the relationship between the control part (control device) and the option unit proposed in the present invention is widely applied to any case that configures the relationship between the side (master) that controls the communication system and the side (slave) that is individually identified and controlled by connecting to the communication system. For example, when a plurality of batteries (battery) mounted in an electric vehicle is assumed, the vehicle controller that controls the batteries corresponds to the control part (control device) proposed in the present invention, and each battery that is controlled by the controller corresponds to the option unit proposed in the present invention. Alternatively, when a PC and expansion devices arbitrarily expanded by the user are assumed, the PC corresponds to the control part (control device) proposed in the present invention, and the expansion devices correspond to the option units proposed in the present invention.

From a broad perspective in which it is not only a product provided with the paper-feeding unit, in order to realize the processing of "2. Identification information setting of option unit", in the present embodiment, it is one or more option units connected to a communication system including a control part for controlling a communication, and an upper side signal line connected to a lower side signal line of an option unit connected in an upper position, a lower side signal line connected to the upper side signal line of an option unit connected in a lower position, and a control circuit are provided. The control circuit sets the potential of the upper side signal line as the first potential until the initialization processing is completed, and when the potential of the lower side signal line is the second potential, the initialization processing starts, and after the initialization processing is completed, the potential of the upper side signal line changes from the first potential to the second potential. It can be said that there is a configuration that the initialization processing performs a processing for setting unique identification information, which is sent from the control part, in each of the option units, and a processing in response to the instruction from the control part by using the set identification information. In addition, in order to realize the processing of "2. Identification information setting of option unit", in the present embodiment, it is a control device, which controls a communication system connecting to one or more option units, and a signal line connecting to the option unit located in the highest position among the option units is provided. It can be said that there is a configuration that a processing for transmitting unique identification information through the communication system is repeated when the response notifying that the identification information is set is obtained from one of the option units through the communication system, and when the potential change detected by the option unit, in which the identification information is set, and transmitting to the option unit located in the upper position is detected in the signal line, it recognizes that the unique identification information is set in all of the option units.

From the aforementioned broad perspective, in the present embodiment, in order to realize the processing of "3. Abnormality detection of option unit", it is one or more option units connected to a communication system including a control part for controlling a communication, and an upper side signal line connecting to a lower side signal line of an option unit connected in the upper position or a lower side signal line provided in the control part, a lower side signal line connecting to an upper side signal line of an option unit connected in the lower position, and a control circuit are provided. In the control circuit, the potential of the upper side signal line in the initial state is defined as the first potential, and the potential of the upper side signal line in the normal state is defined as the second potential which is different from the first potential. It can be said that there is a disclosure of a configuration that the potential of the upper side signal line is changed from the second potential in response to the potential change from the second potential of the lower side signal line caused by generating an abnormality in the option unit located in the lower position. In addition, in the present embodiment, in order to realize the processing of "3. Abnormality detection of option unit", it is a control device controlling a communication system connecting to one or more option units, and a signal line connecting to the option unit connected in the highest position among the option units connected in series is provided. It can be said that there is a configuration that the occurrence of abnormality in at least one of the option units is detected by the potential change of the signal line.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An option unit electrically connected to a communication system that is controlled by a control part, the option unit comprising:
   an upper side signal line connecting with one of the control part and an upper option unit that is positioned closer to the control part than the option unit and electrically connected with the communication system;
   a lower side signal line connecting with an lower option unit that is positioned more apart from the control part than the option unit and electrically connected with the communication system; and
   a control circuit,
   the control circuit being configured to set a potential of the upper side signal line in an initial state as a first potential, and set the potential of the upper side signal line in a normal state as a second potential which is different from the first potential, and configured to control the potential of the upper side signal line to change from the second potential in response to a potential change from the second potential of the lower side signal line.

2. The option unit according to claim 1, wherein
   the potential change from the second potential of the lower side signal line indicates an occurrence of abnormality in the lower option unit, and
   regardless the potential of the lower side signal line, when the abnormality is generated in the option unit, the potential of the upper side signal line of the option unit for which the abnormality is generated is changed from the second potential.

3. The option unit according to claim 1, further comprising
   a connection circuit connecting between the upper side signal line and the lower side signal line, the connection circuit being configured to change the potential of the upper side signal line from the second potential in response to the potential change from the second potential of the lower side signal line.

4. The option unit according to claim 3, wherein
   the connection circuit includes a switch configured to perform switching of the potential of the upper side signal line from the second potential, and a power supply unit configured to supply a necessary power supply for an operation of the switch,
   the power supply unit is configured to start supplying the power supply when the option unit becomes the normal state, and
   the switch is configured to execute the switching in response to the potential change from the second potential of the lower side signal line.

5. The option unit according to claim 3, wherein
   the control circuit is configured to set the potential of the upper side signal line as the first potential until an initialization processing is completed, and when the potential of the lower side signal line is the second potential, the control circuit is configured to start the initialization processing, and the control circuit is configured to change the potential of the upper side signal line from the first potential to the second potential after the initialization processing is completed so as to change the potential of the upper side signal line to the second potential, and
   the initialization processing includes a processing for setting unique identification information, which is transmitted from the control part, in each of the option unit and at least one of the upper and lower option units.

6. The option unit according to claim 1, wherein
   the lower side signal line electrically connects to a power supply of the second potential through a resistance.

7. A control device configured to control a communication system to which at least upper and lower option units are electrically connected, the control device comprising:
   a signal line connecting with the upper option unit which is positioned closer to the control device than the lower option unit,
   a processor configured to repeatedly transmit unique identification information to the upper and lower option units through the communication system,
   when detecting in the signal line a potential change of the upper option unit in which the identification information has been set, the control device being configured to recognize a completion for setting the unique identification information in all of the upper and lower option units.

8. The control device according to claim 7, wherein
   after the identification information that is unique is set in all of the upper and lower option units, an occurrence of the abnormality in at least one of the upper and lower option units is detected by the potential change of the signal line.

9. The control device according to claim 7, wherein
   transmission of the identification information starts after a predetermined standby time, which counts from a time that the power supply is applied to the communication system, and is required for booting the maximum number of option units mountable in the communication system.

10. A facsimile device comprising:

a scanner unit configured to perform read-out of a document;

a facsimile unit configured to execute a facsimile transmission of image data generated by the read-out to an outside, and a reception of image data which is facsimile-transmitted from the outside;

a printing unit configured to print an image on a paper that has been supplied, based on the image data that has been received;

a paper-feeding unit configured to supply the paper and mountable to the facsimile device, the paper-feeding unit including first and second paper-feeding units, the first paper-feeding unit having a first upper side signal line and a first lower side signal line; and a control part configured to communicate each of the scanner unit, the facsimile unit, the printing unit, and the paper-feeding unit;

the first paper-feeding unit being positioned closer to the control part than the second paper-feeding unit, a potential of the first upper side signal line until an initialization processing is completed being a first potential, and when a potential of the first lower side signal line is a second potential, the initialization processing starting, and the potential of the first upper side signal line being changed from the first potential to the second potential after the initialization processing is completed, the initialization processing including a processing for setting unique identification information, which is transmitted from the control part, in each of the first and second paper-feeding units, the control part being configured to execute a paper-feeding instruction to the first and second paper-feeding units by using the identification information that is set in each of the first and second paper-feeding units, the paper-feeding units being configured to supply stored papers or papers supplied from the second paper-feeding unit to the first paper-feeding unit or the printing unit in response to the paper-feeding instruction.

11. The facsimile device according to claim 10, wherein the second paper-feeding unit has a second upper side signal line and a second lower side signal line, the second upper side signal line connects with the first lower side signal line, the initialization processing starts in the second paper-feeding unit, and after the initialization processing of the second paper-feeding unit is completed, the potential of the first lower side signal line becomes the second potential by changing the potential of the second upper side signal line from the first potential to the second potential such that the initialization processing is executed in an order from the second paper-feeding unit to the first paper-feeding unit.

* * * * *